Patented Aug. 11, 1925.

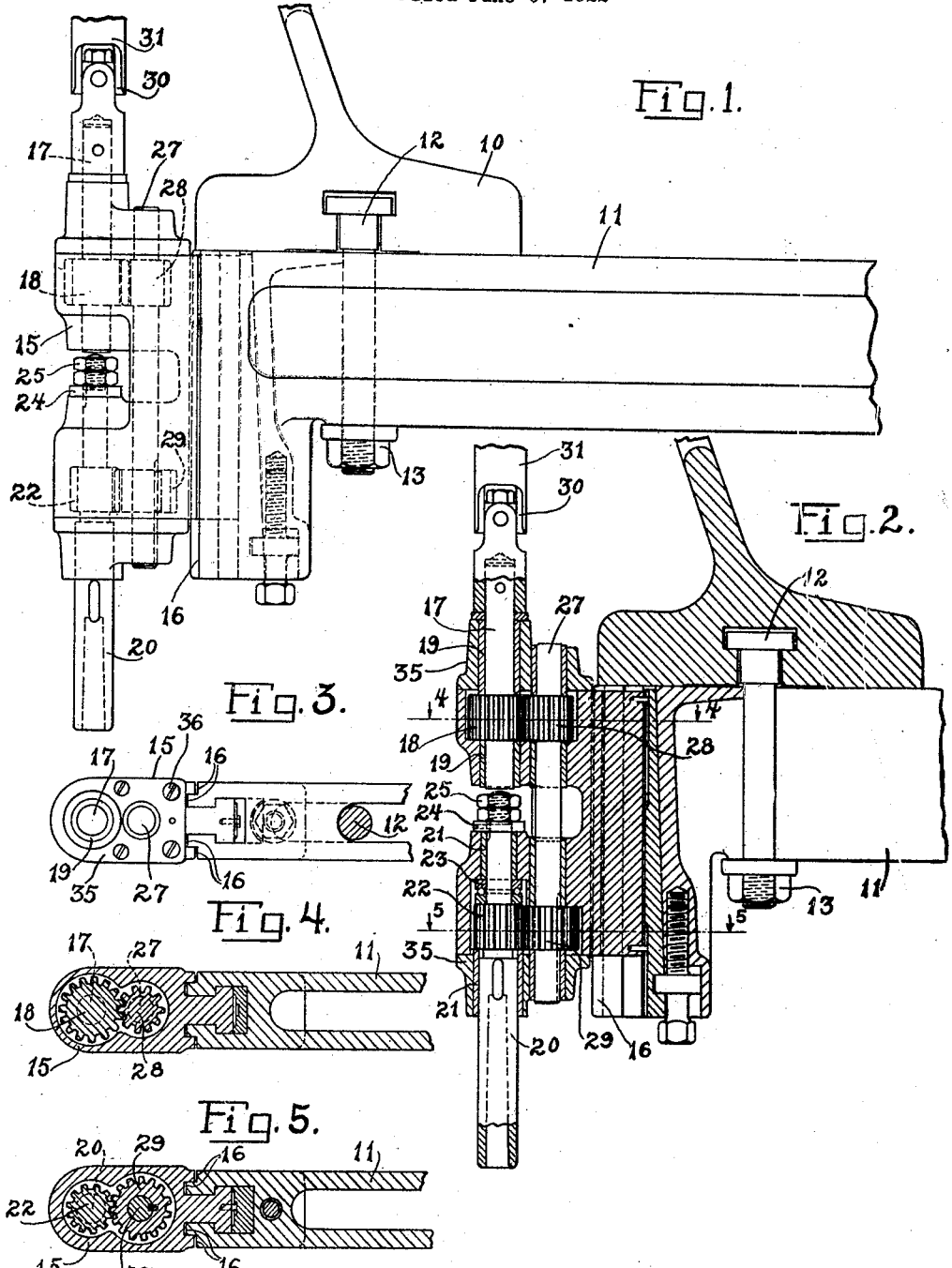

1,549,614

UNITED STATES PATENT OFFICE.

JOHN M. RUSNAK, OF HARTFORD, CONNECTICUT, ASSIGNOR TO PRATT & WHITNEY COMPANY, OF NEW YORK, N. Y., A CORPORATION OF NEW JERSEY.

DRILL SPINDLE FOR MULTIPLE-SPINDLE DRILLS.

Application filed June 5, 1922. Serial No. 566,166.

*To all whom it may concern:*

Be it known that I, JOHN M. RUSNAK, a citizen of the United States, residing at Hartford, in the county of Hartford and State of Connecticut, have invented certain new and useful Improvements in Drill Spindles for Multiple-Spindle Drills, of which the following is a specification.

This invention relates to multiple spindle drills and in particular to a mechanism that may be mounted on the end of one of the adjustable drill carrying arms permitting a drill spindle therein to be rotated at an increased speed relative to its driving shaft.

An object of the present invention is to provide a drill head mounted at one end of an adjustable arm of a multiple spindle drill having a drill spindle which may be driven at an increased speed compared to the driving shaft and so arranged that it will take up very little space and have the drill spindle in direct alignment with its driving shaft.

Another object of the invention is to provide a simple and compact mechanism for varying the speed of individual spindles of a multiple spindle drill, this mechanism taking up substantially the same space as the spindle heads usually provided on the adjustable arms of multiple spindle drilling machines.

One feature which enables me to accomplish the above named objects is that I provide a small spindle head adjustably secured at one end of one of the adjustable arms which has aligned bearing portions for a driving shaft and a drill spindle and, directly in rear of the drill spindle and its driving shaft, provide a parallel intermediate shaft. The driving shaft and intermediate shaft are in driving relation to each other by means of a pair of gears, and the intermediate shaft and the drill spindle are also in driving relation by another pair of gears, the ratio of both pairs of the gears being such that the drill spindle is driven at an increased speed relative to its driving shaft, or if desired at a materially lower speed.

With these and other objects in view, my invention consists in the features of construction and operation set forth in the following specification and illustrated in the accompanying drawing.

In the accompanying drawing annexed hereto and forming a part of this specification, I have shown my invention embodied in a form of multiple spindle drilling machine but it will be understood that the invention can be otherwise embodied and that the drawing is not to be construed as defining or limiting the scope of the invention, the claims appended to this specification being relied upon for that purpose.

In the drawing:

Figure 1 is a view in elevation of the invention shown in relation to an adjustable arm of a multiple spindle drilling machine.

Fig. 2 is a vertical sectional view of the same.

Fig. 3 is a plan view of the adjustable arm and head.

Fig. 4 is a horizontal sectional view taken on line 4—4 of Fig. 2.

Fig. 5 is a horizontal sectional view taken on line 5—5 of Fig. 2.

In the above mentioned drawing, I have shown but one embodiment of the invention which is now deemed preferable, but it is to be understood that changes and modifications may be made within the scope of the appended claims without departing from the spirit of the invention.

Briefly, my invention in its broadest aspect comprises the following principal parts: first, an adjustable arm adapted to be attached to a drill head or other movable means of a drilling machine; second, a spindle head adjustably secured at one end of the adjustable arm so that it may be moved vertically thereon; third, a drill spindle in said adjustably mounted head; fourth, a driving shaft in the head which may be driven through a universal joint as shown; fifth, an intermediate shaft rotatably mounted in the spindle head, the axis of this intermediate shaft being parallel to the axis of the drill spindle and driving shaft; sixth, two pairs of gears, one pair disposed between the driving shaft and the intermediate shaft and the other pair being disposed between the intermediate shaft and the drill spindle, the ratio of these gears being such that the drill spindle is driven at a materially higher or lower speed than its driving shaft dependent upon the arrangement of the gears within the mechanism.

Referring more in detail to the figures of the drawing at 10 I show a fragmentary part of a spindle supporting head adapted to carry a plurality of adjustable arms one of which is shown at 11. This head 10 and arm 11 are substantially similar to those usually employed in multiple spindle drilling machines. To adjustably attach and clamp the adjustable arm 11 to the lower plane surface of the head 10, I provide a bolt 12 entering a suitably shaped slot in the head 10 and extending through an elongated slot in the adjustable arm 11. A nut 13 at the lower end of this bolt provides ready means for quickly adjusting and clamping the arm 11 in any desired position.

It is frequently desirable in multiple spindle drills of the type for which my present invention is adapted to have a few of the spindles capable of being driven at an increased speed compared to the other spindles, the construction being such that the higher speeded spindle or spindles may be positioned in any adjustment possible with those operating at normal speed. I therefore provide the spindle head as shown at 15 which may be adjustably secured and clamped to the end vertical face 16 of the adjustable arm 11. The clamping means for this spindle head 15 is similar to that shown in my Patent No. 1,464,542 granted August 14, 1923, so that further description thereof is not thought necessary. Within the spindle head 15 is a driving shaft 17 having a gear 18 thereon preferably formed integrally thereon. This shaft 17 and gear 18 are rotated in a suitable bearing formed by sleeves 19. In alignment with this shaft is a drill spindle 20 rotatably mounted within sleeves 21. On the drill spindle 20 is a gear 22 and above the gear is an end thrust bearing 23 so that the spindle may be rotated without undue friction. In order to retain the drill spindle 20 in place a washer 24 and nuts on the threaded upper end of the spindle are provided.

Also mounted in the spindle head 15 in an axis parallel to the axis of the driving shaft 17 and drill spindle 20 is an intermediate shaft 27 having gears 28 and 29 thereon so placed that they mesh respectively with the gears 18 and 22. The ratio between the gears 18 and 28, more clearly shown in Fig. 4, is such that the intermediate shaft 27 is driven at an increased speed relative to the driving shaft 17. Also the ratio between the gears 29 and 22 is such that the drill spindle 20 is driven at an increased speed relative to the intermediate shaft 27. It will thus be seen that with the number of teeth in the various gears chosen substantially as shown the drill spindle 20 may be driven at a materially increased speed relative to its driving shaft 17. It will also be seen that this spindle 20 is directly in alignment with its driving shaft 17 and is in substantially the same position it would assume were the driving connections between the driving shaft 17 and spindle direct as is usually found in these drill spindles.

The driving shaft 17 may be driven from any convenient source as usually provided in this type of drill. A universal joint 30 is shown, the upper end of which being attached to the flexible shaft 31 which may be driven from any suitable source of power.

It will thus be seen that a small, compact and simple means has been provided for materially increasing the speed of a drill spindle of a multiple spindle drill without unduly enlarging or complicating the head within which it is rotatably mounted. Preferably and as shown, all of the operative parts of the mechanism are enclosed within the spindle head 15. The upper and lower ends of the spindle head 15 are provided with supplementary members 35 having bearing portions for the shafts 17 and 27 and the spindle 20. These supplementary members are attached to the spindle head 15 by any suitable means such as the screws 36.

It is obvious that all of the specific details described above need not be used in any one embodiment of the invention. For instance, the shaft 17 and spindle 20 need not be in alignment with each other. Also the particular form of the spindle head 15 may be widely varied from the particular form shown without departing from the present invention. For convenience, however, I prefer to have the shaft 17 and spindle 20 in alignment and the spindle head 15 so formed that it will form a central recess dividing the head into an upper and a lower portion, the space between being taken up with the adjusting means for the spindle 20.

What I claim is:

1. A multiple spindle drilling machine comprising in combination, a spindle carrying head, an adjustable arm on said head having a spindle head adjustably secured at one end, a drill spindle in said head, a driving shaft therefor, and an intermediate shaft, the driving shaft and the drill spindle being in alignment and said intermediate shaft lying parallel to said driving shaft and drill spindle, gears respectively connecting said driving shaft and intermediate shaft and the intermediate shaft and drill spindle whereby the drill spindle may be driven at a higher speed than the driving shaft while being located in alignment therewith.

2. A multiple spindle drilling machine comprising in combination, a spindle carrying head, an adjustable arm on said head having a vertically adjustable spindle head at one end, a drill spindle in said head, a driving shaft therefor, and an intermediate shaft within said head, the driving shaft and the drill spindle being in alignment and said intermediate shaft lying parallel to said driving shaft and drill spindle, gears respectively connecting said driving shaft and intermediate shaft and the intermediate shaft and drill spindle whereby the drill spindle may be driven at a higher speed than the driving shaft while being located in alignment therewith.

3. A drilling machine comprising in combination, an arm, a spindle head thereon, a drill spindle in said head having a gear thereon, a driving shaft for said drill spindle having a gear thereon, and an intermediate shaft having gears thereon in mesh with the gears on the driving shaft and drill spindle parallel to said drill spindle and driving shaft, said intermediate shaft being positioned within a central body portion of the spindle head and the driving shaft and drill spindle positioned in extensions thereof, the ratio of the gears being such that the drill spindle is driven at a different speed from the said drive shaft.

4. A drilling machine comprising in combination, an arm, a spindle head thereon, a drill spindle in said head having a gear thereon, a driving shaft for said drill spindle having a gear thereon, an intermediate shaft parallel to said drill spindle and driving shaft, said intermediate shaft having gears thereon in mesh respectively with said gears on the drill spindle and on said driving shaft, the driving shaft, intermediate shaft and drill spindle being mounted in a central body portion of the spindle head, and supplementary members secured to the opposite ends of the spindle head, said driving shaft, intermediate shaft and drill spindle being also rotatable within said supplementary members.

In testimony whereof, I hereto affix my signature.

JOHN M. RUSNAK.